(12) United States Patent
Wu et al.

(10) Patent No.: US 6,473,558 B1
(45) Date of Patent: *Oct. 29, 2002

(54) SYSTEM AND METHOD FOR MPEG REVERSE PLAY THROUGH DYNAMIC ASSIGNMENT OF ANCHOR FRAMES

(75) Inventors: Scarlett Wu, Hillsborough, CA (US); Arvind Patwardhan, San Jose, CA (US); Osamu Takiguchi, Tokyo (JP)

(73) Assignee: LSI Logic Corporation, Milpitas, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/105,938

(22) Filed: Jun. 26, 1998

(51) Int. Cl.$^7$ ............................................... H04N 5/783
(52) U.S. Cl. ........................ 386/68; 386/125; 386/126
(58) Field of Search ............................ 386/46, 68, 80, 386/81, 111, 112, 125, 126; H04N 5/783

(56) References Cited

U.S. PATENT DOCUMENTS

| | | | |
|---|---|---|---|
| 5,809,245 A | 9/1998 | Zenda | |
| 5,841,938 A | * 11/1998 | Nitta et al. | 386/68 |
| 5,889,515 A | 3/1999 | McDade et al. | |
| 5,974,224 A | * 10/1999 | Nagata | 386/109 |
| 6,009,229 A | * 12/1999 | Kawamura | 386/68 |

* cited by examiner

*Primary Examiner*—Huy Nguyen
(74) *Attorney, Agent, or Firm*—Conley, Rose & Tayon

(57) ABSTRACT

A method and system for displaying a series of video frames in reverse order. The video frames are received in groups of pictures (GOPs) from a storage medium. The method comprises steps of (a) decoding and storing a number of frames from an initial GOP into frame buffers according to an ordering of the frame buffers, (b) displaying the stored frames according to the reverse ordering of the frame buffers, (c) decoding and storing a number of frames from a first preceding GOP according to the reverse ordering of the frame buffers, (d) displaying the stored frames according to the ordering of the frame buffers, (e) decoding and storing a number of frames from a second preceding GOP according to the ordering of the frame buffers, and (f) repeating steps (b)–(e),for prior first and second preceding GOPs.

15 Claims, 5 Drawing Sheets

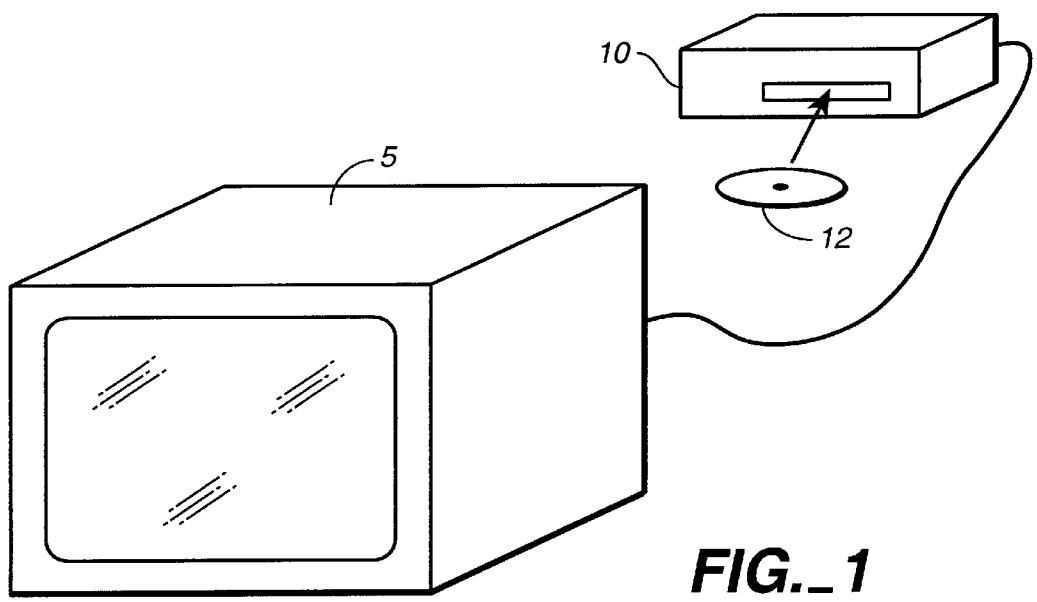
FIG._1
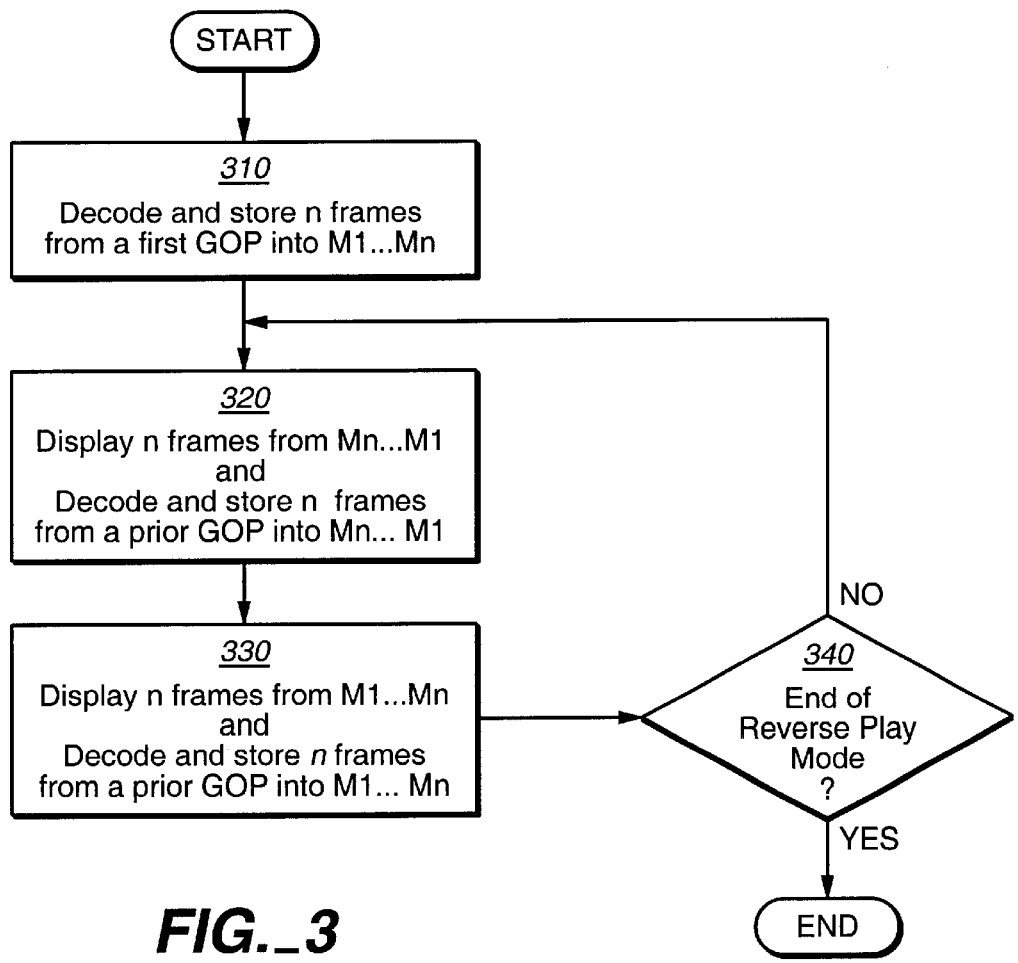
FIG._3

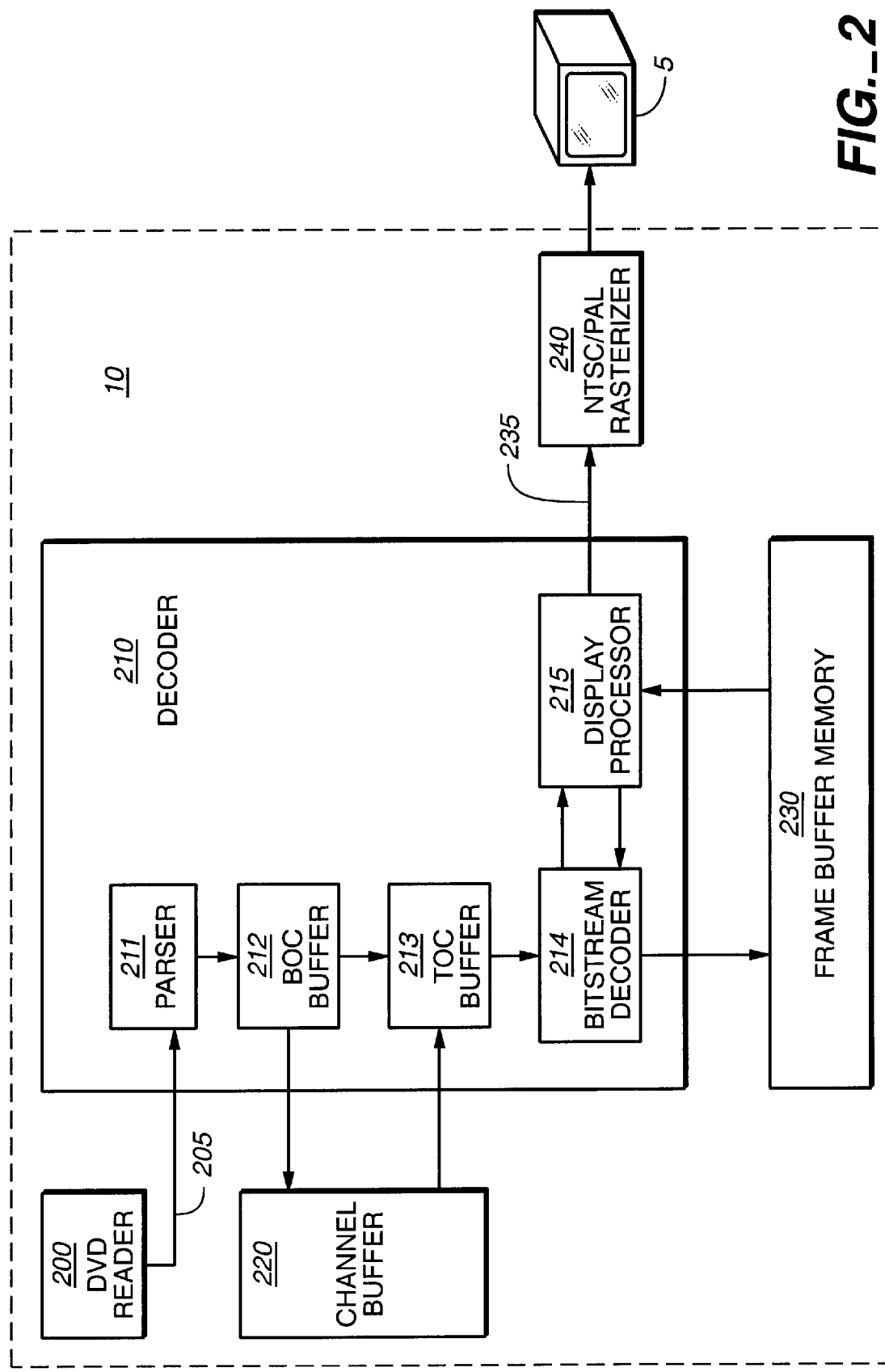
FIG._2

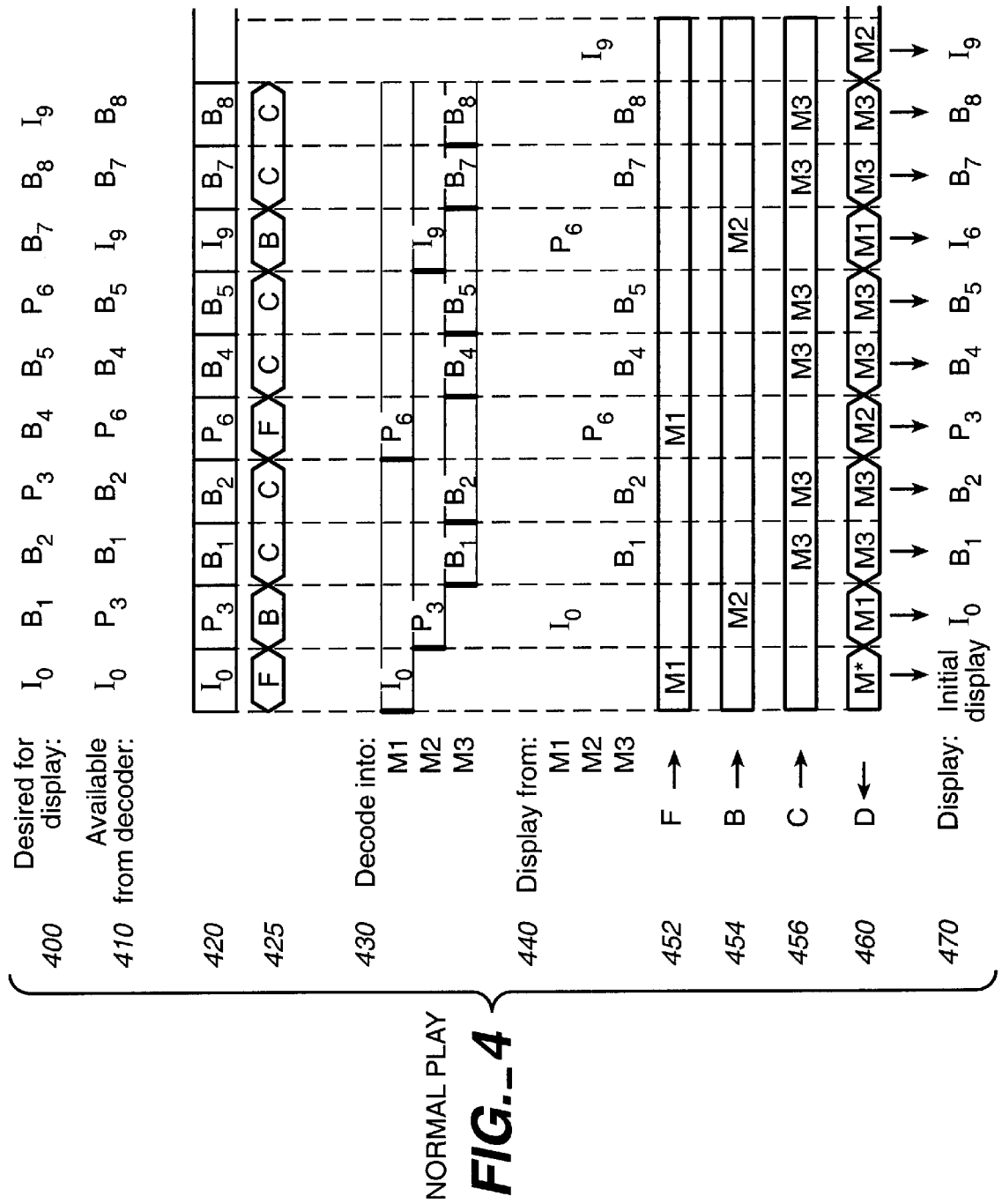
NORMAL PLAY
FIG._4

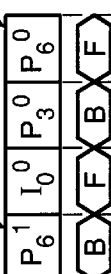

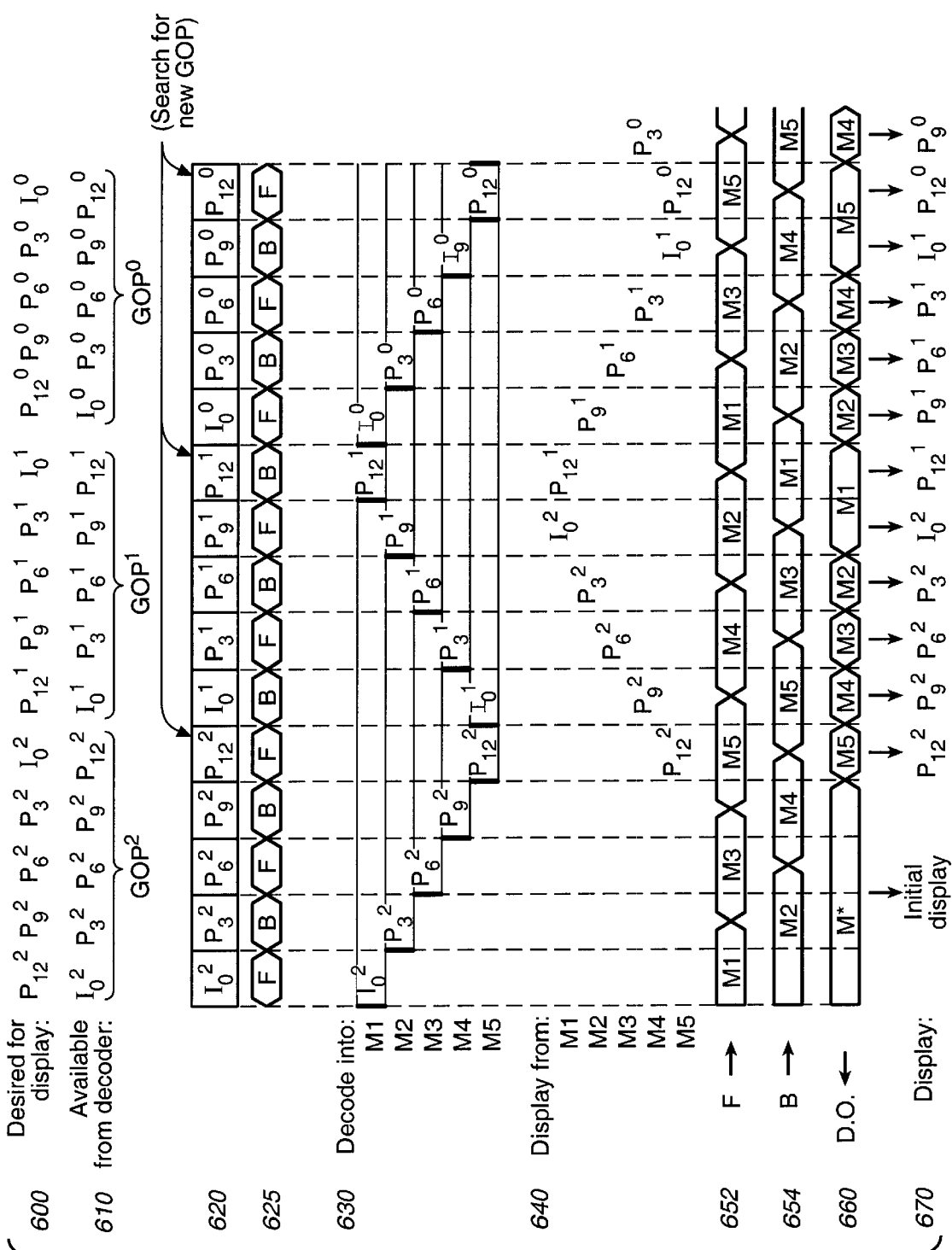
FIG._6 FAST REVERSE PLAY 5 FRAME BUFFERS

SYSTEM AND METHOD FOR MPEG REVERSE PLAY THROUGH DYNAMIC ASSIGNMENT OF ANCHOR FRAMES

BACKGROUND OF THE INVENTION

1. Field of the Invention

This invention generally relates to the field of digital video decoding, and more particularly to display mechanisms for reverse play in an MPEG player.

2. Description of the Related Art

Full-motion digital video requires a large amount of storage and data transfer bandwidth. Thus, video systems use various types of video compression algorithms to reduce the amount of necessary storage and transfer bandwidth. In general, different video compression methods exist for still graphic images and for full-motion video. Intraframe compression methods are used to compress data within a still image or single frame using spatial redundancies within the frame. Interframe compression methods are used to compress multiple frames, i.e., motion video, using the temporal redundancy between the frames. Interframe compression methods are used exclusively for motion video, either alone or in conjunction with intraframe compression methods.

Intraframe or still image compression techniques generally use frequency domain techniques, such as the discrete cosine transform (DCT). Intraframe compression typically uses the frequency characteristics of a picture frame to efficiently encode a frame and remove spatial redundancy. Examples of video data compression for still graphic images are JPEG (Joint Photographic Experts Group) compression and RLE (run-length encoding). JPEG compression is a group of related standards that use the discrete cosine transform (DCT) to provide either lossless (no image quality degradation) or lossy (imperceptible to severe degradation) compression. Although JPEG compression was originally designed for the compression of still images rather than video, JPEG compression is used in some motion video applications. The RLE compression method operates by testing for duplicated pixels in a single line of the bit map and storing the number of consecutive duplicate pixels rather than the data for the pixels themselves.

In contrast to compression algorithms for still images, most video compression algorithms are designed to compress full motion video. As mentioned above, video compression algorithms for motion video use a concept referred to as interframe compression to remove temporal redundancies between frames. Interframe compression involves storing only the differences between successive frames in the data file. Interframe compression stores the entire image of a key frame or reference frame, generally in a moderately compressed format. Successive frames are compared with the key frame, and only the differences between the key frame and the successive frames are stored. Periodically, such as when new scenes are displayed, new key frames are stored, and subsequent comparisons begin from this new reference point. It is noted that the interframe compression ratio may be kept constant while varying the video quality. Alternatively, interframe compression ratios may be content-dependent, i.e. if the video clip being compressed includes many abrupt scene transitions. from one image to another, the compression is less efficient. Examples of video compression which use an interframe compression technique are MPEG, DVI and Indeo, among others.

MPEG Background

A compression standard referred to as MPEG (Moving Pictures Experts Group) compression is a set of methods for compression and decompression of full motion video images which uses the interframe and intraframe compression techniques described above. MPEG compression uses both motion compensation and discrete cosine transform (DCT) processes, among others, and can yield very high compression ratios.

The two predominant MPEG standards are referred to as MPEG-1 and MPEG-2. The MPEG-1 standard generally concerns inter-field data reduction using block-based motion compensation prediction (MCP), which generally uses temporal differential pulse code modulation (DPCM). The MPEG-2 standard is similar to the MPEG-1 standard, but includes extensions to cover a wider range of applications, including interlaced digital video such as high definition television (HDTV).

Interframe compression methods such as MPEG are based on the fact that, in most video sequences, the background remains relatively stable while action takes place in the foreground. The background may move, but large portions of successive frames in a video sequence are redundant. MPEG compression uses this inherent redundancy to encode or compress frames in the sequence.

An MPEG stream includes three types of pictures, referred to as the Intra (I) frame, the Predicted (P) frame, and the Bi-directional Interpolated (B) frame. The I (intra) frames contain the video data for the entire frame of video and are typically placed every 10 to 15 frames. Intraframes provide entry. points into the file for random access, and are generally only moderately compressed. Predicted frames are encoded with reference to a past frame, i.e., a prior Intraframe or Predicted frame. Thus P frames only include changes relative to prior I or P frames. In general, P frames receive a fairly high amount of compression and are used as references for future P frames. Thus, both I and P frames are used as references for subsequent frames. Bi-directional pictures include the greatest amount of compression and require both a past and a future reference in order to be encoded. Bi-directional frames are never used as references for other frames.

In general, for the frame(s) following a reference frame, i.e., P and B frames that follow a reference I or P frame, only small portions of these frames are different from the corresponding portions of the respective reference frame. Thus, for these frames, only the differences are captured, compressed and stored. The differences between these frames are typically generated using motion vector estimation logic, as discussed below.

When an MPEG encoder receives a video file or bitstream, the MPEG encoder generally first creates the I frames. The MPEG encoder may compress the I frame using an intraframe lossless compression technique. After the I frames have been created, the MPEG encoder divides respective frames into a grid of 16×16 pixel squares called macroblocks. The respective frames are divided into macroblocks in order to perform motion estimation/compensation. Thus, for a respective target picture or frame, i.e., a frame being encoded, the encoder searches for a best fit or best match between the target picture macroblock and a block in a neighboring picture, referred to as a search frame. For a target P frame, the encoder searches in a prior I or P frame. For a target B frame, the encoder searches in a prior and subsequent I or P frame. When a best match is found, the encoder transmits a vector movement code or motion vector. The vector movement code or motion vector includes a pointer to the best fit search frame block as well as information on the difference between the best fit block and the respective target block. The blocks in target pictures that have no change relative to the block in the reference or search frame are ignored. Thus the amount of data that is actually stored for these frames is significantly reduced.

After motion vectors have been generated, the encoder then encodes the changes using spatial redundancy. Thus, after finding the changes in location of the macroblocks, the MPEG algorithm further calculates and encodes the difference between corresponding macroblocks. Encoding the difference is accomplished through a math process referred to as the discrete cosine transform or DCT. This process divides the macroblock into four sub-blocks, seeking out changes in color and brightness. Human perception is more sensitive to brightness changes than color changes. Thus the MPEG algorithm devotes more effort to reducing color space rather than brightness.

Therefore, NPEG compression is based on two types of redundancies in video sequences, these being spatial, which is the redundancy in an individual frame, and temporal, which is the redundancy between consecutive frames. Spatial compression is achieved by considering the frequency characteristics of a picture frame. Each frame is divided into non-overlapping blocks and respective sub-blocks, and each block is transformed via the discrete cosine transform (DCT).

After the transformed blocks are converted to the "DCT domain", each entry in the transformed block is quantized with respect to a set of quantization tables. The quantization step for each entry can vary, taking into account the sensitivity of the human visual system (HVS) to the frequency. Since the HVS is more sensitive to low frequencies, most of the high frequency entries are quantized to zero. In this step where the entries are quantized, information is lost and errors are introduced to the reconstructed image. Zero run length encoding is used to transmit the quantized values.

The statistical encoding of the expected runs of consecutive zeroed-valued coefficients corresponding to the higher-order coefficients accounts for considerable compression gain.

In order to cluster non-zero coefficients early in the series and to encode as many zero coefficients as possible following the last non-zero coefficient in the ordering, the coefficient sequence, is often organized in a specified orientation termed zigzag ordering. Zigzag ordering concentrates the highest spatial frequencies at the end of the series. Once the zigzag ordering has been performed, the encoder performs "run-length coding" on the AC coefficients. This process reduces each 8 by 8 block of DCT coefficients to a number of events represented by a non-zero coefficient and the number of preceding zero coefficients. Because the high-frequency coefficients are more likely to be zero, runlength coding results in additional video compression.

The video encoder then performs variable-length coding (VLC) on the resulting data. VLC is a reversible procedure for coding data that assigns shorter code words to frequent events and longer code words to less frequent events, thereby achieving additional video compression. Huffman encoding is a particularly well-known form of VLC that reduces the number of bits necessary to represent a data set without losing any information.

The final compressed video data is then ready to be transmitted to a storage device or over a transmission medium for reception and decompression by a remotely located decoder. Because of the picture dependencies, i.e., the temporal compression, the order in which the frames are transmitted, stored, or retrieved, is not necessarily the display order, but rather an order required by the decoder to properly decode the pictures in the bitstream. For example, a typical series of frames, in display order, might be shown as follows:

$I_0 \ B_1 \ B_2 \ P_3 \ B_4 \ B_5 \ P_6 \ B_7 \ B_8 \ P_9 B_{10} B_{11} I_{12} B_{13} B_{14} \ P_{15} \ B_{16} \ B_{17} \ P_{18}$

The indices indicate the display order of the frames. By contrast, the bitstream order corresponding to the given display would be as follows:

$I_0 \ P_3 \ B_1 \ B_2 \ P_6 \ B_4 \ B_5 \ P_9 \ B_7 \ B_8 I_{12} B_{10} B_{11} P_{15} B_{13} \ B_{14} \ P_{18} \ B_{16} \ B_{17}$

Because a B frame depends on a subsequent I or P frame in display order, the I or P frame must be transmitted and decoded before the dependent B frame.

As discussed above, temporal compression makes use of the fact that most of the objects remain the same between consecutive picture frames, and the difference between objects or blocks in successive frames is their position in the frame as a result of motion (either due to object motion, camera motion or both). The key to this relative encoding is motion estimation. In general, motion estimation is an essential processing requirement in most video compression algorithms. In general, motion estimation is the task of identifying temporal redundancy between frames of the video sequence.

The video decoding process is generally the inverse of the video encoding process and is employed to reconstruct a motion picture sequence from a compressed and encoded bitstream. The data in the bitstream is decoded according to a syntax that is defined by the data compression algorithm. The decoder must first identify the beginning of a coded picture, identify the type of picture, then decode each individual macroblock within a particular picture.

When encoded video data is transferred to a video decoder, the encoded video data is received and stored in a rate or channel buffer. The data is then retrieved from the channel buffer by a decoder or reconstruction device for performing the decoding process. When the MPEG decoder receives the encoded stream, the MPEG decoder reverses the above operations. Thus the MPEG decoder performs inverse scanning to remove the zigzag ordering, inverse quantization to de-quantize the data, and the inverse DCT to convert the data from the frequency domain back to the pixel domain. The MPEG decoder also performs motion compensation using the transmitted motion vectors to re-create the temporally compressed frames.

When frames are received which are used as references for other frames, such as I or P frames, these frames are decoded and stored in memory. When a reconstructed frame is a reference or anchor frame, such as an I or a P frame, the reconstructed frame replaces the oldest stored anchor frame and is used as the new anchor for subsequent frames.

When a temporally compressed or encoded frame is received, such as a P or B frame, motion compensation is performed on the frame using the neighboring decoded I or P reference frames, also called anchor frames. The temporally compressed or encoded frame, referred to as a target frame, will include motion vectors which reference blocks in neighboring decoded I or P frames stored in the memory. The MPEG decoder examines the motion vector, determines the respective reference block in the reference frame, and accesses the reference block pointed to by the motion vector from the memory.

In order to reconstruct a B frame, the two related anchor frames or reference frames must be decoded and available in a memory, referred to as the picture buffer. This is necessary since the B frame was encoded relative to these two anchor frames. Thus the B frame must be interpolated or reconstructed using both anchor frames during the reconstruction process.

After all of the macroblocks have been processed by the decoder, the picture reconstruction is complete. The resultant coefficient data is then inverse quantized and operated on by an IDCT process to transform the macroblock data from the frequency domain to data in the time and space domain. As noted above, the frames may also need to be re-ordered before they are displayed in accordance with their display order instead of their coding order. After the frames are re-ordered, they may then be displayed on an appropriate display device.

As described above, as the encoded video data is decoded, the decoded data is stored into a picture store buffer. In some configurations, the channel and picture buffers are incorporated into a single integrated memory buffer. The decoded data is in the form of decompressed or decoded I, P or B frames. A display processor retrieves the picture data for display by an appropriate display device, such as a TV monitor or the like.

The memory is a major cost item in the production of video encoders, and generally memories with higher bandwidths cost more. Thus, it is desirable to reduce the memory bandwidth requirements of the encoder system as much as possible to either reduce the cost or allow for increased performance.

A particular challenge in the decoding of MPEG data concerns the playing of the encoded video frames in sequences other than the normal play sequence, for example, in reverse play. As in the case of normal play, reverse play is not a simple matter of decoding the frames in reverse order and displaying them upon decoding, since B and P frames can not be interpreted without the anchor frames on which they depend. Further, the encoded frames are generally not randomly accessible, but are rather available in collections, called "GOPs" that each start with an I frame. A GOP (group of pictures) is typically accessible in the normal read order, that is, starting with the encoded I frame and with encoded dependent frames following the frames upon which they depend. A simple method for performing reverse play comprises reading GOPs in reverse order, and decoding and displaying only the first I frame from each GOP. This method, while readily implemented, leads to a video stream of poor fluency since substantially large sections of video (approximately 15 frames, or ½ sec) are left out of the display sequence. It would be desirable to have a system for smoothly displaying reverse-play MPEG video while minimizing the required quantity of memory for temporary storage.

SUMMARY OF THE INVENTION

Accordingly, there is provided herein a system and a method for displaying a series of video frames in reverse order. According to the method, the video frames are received in groups of pictures (GOPs) from a storage medium. The method comprises steps of (a) decoding and storing a number of frames from an initial GOP into frame buffers according to an ordering of the frame buffers, (b) displaying the stored frames according to the reverse ordering of the frame buffers, (c) decoding and storing a number of frames from a first preceding GOP according to the reverse ordering of the frame buffers, (d) displaying the stored frames according to the ordering of the frame buffers, (e) decoding and storing a number of frames from a second preceding GOP according to the ordering of the frame buffers, and (f) repeating steps (b)–(e) for prior first and second preceding GOPs.

BRIEF DESCRIPTION OF THE DRAWINGS

Other objects and advantages of the invention will become apparent upon reading the following detailed description and upon reference to the accompanying drawings in which:

FIG. 1 shows an representative system for displaying digital video stored on a disk;

FIG. 2 is a block diagram of a DVD player from FIG. 1;

FIG. 3 is a flowchart of a method for displaying frames in reverse order;

FIG. 4 shows diagrams for using pointers to load frames into 3 frame buffers for normal playback;

FIG. 5 shows diagrams for using pointers to load frames into 3 frame buffers for fast reverse playback; and FIG. 6 shows diagrams for using pointers to load frames into 5 frame buffers for fast reverse playback.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

FIG. 1: System for Displaying Compressed Digital Video

FIG. 1 shows an embodiment of a system for displaying a series of video frames encoded in a data stream of compressed video data. In this embodiment, the system comprises a video decoding unit such as a DVD (Digital Versatile Disk) player 10 coupled to a display device 5. DVD player 10 is a video decoding unit configured to read MPEG2 compressed video data from a DVD disk 12, decode a series of video frames from the compressed video data, and provide the frames in a video output signal to display device 5. The video output signal is preferably a standard format video signal, such as an NTSC signal or a PAL signal. Display device 5 then displays the frames received in the video output signal from DVD player 5.

In this embodiment, DVD player 10 reads the compressed video data from DVD disk 12 at a predetermined frame rate, such as 25, 30, or 60 frames per second. DVD player 10 is configured to play the frames in reverse by appropriately decoding and storing group of frames (GOP) and displaying frames from the GOP in reverse order. A GOP is a readily accessible series of frames, starting with an I frame. In typical DVD systems, the GOPs may be quickly read from a DVD disk by jumping to the location on the disk at which the GOP begins. The frames may then be read in their order of storage, which is appropriate for decoding the frames, and stored in a memory as discussed below.

In one embodiment, display device 5 is preferably a TV display or other video monitor. In another embodiment of the invention, display device 5 is a recording device, such as a video tape recorder or an optical disk recorder, that records an analog signal, such, as an NTSC signal or PAL signal, or a compressed or uncompressed digital signal. In yet another embodiment of the invention, display device 5 is a transmitting device, such as an RF transmitter or a cable transmission system. Display device 5 may also be a computer system that displays or stores frames in the video output signal.

FIG. 2: DVD Player

A block diagram of DVD player 10 is shown in FIG. 2. DVD Player 10 comprises a DVD reader 200, a decoder 210, a channel buffer 220, a frame buffer memory 230 and an NTSC/PAL rasterizer 240. DVD reader 200 reads a data stream 205 from DVD disk 12. Data stream 205 comprises an MPEG video stream and an MPEG audio stream. Data stream 205 may further comprise additional video and audio data streams, such as Dolby AC-3 audio, DTS audio, SDDS audio, linear PCM audio, and other information such as navigation data and sub-picture unit data (SPU). From data stream 205, decoder 210 generates a decoded video signal 235 and provides decoded video signal 235 to rasterizer 240. Rasterizer 240 generates a suitable video signal, such as an NTSC signal or a PAL signal, for display device 5.

Decoder 210 comprises several block units for decoding data stream 205 into decoded video signal 235. The sub-blocks include a parser 211, a BOC buffer 212, a TOC buffer 213, a bitstream decoder 214, and a display processor 215. Parser 211 receives the data stream 205 from DVD reader 200 and separates the interleaved packets in data stream 205 into separate data streams. These separate data streams, one for each type of data used by decoder 210, are provided to bottom of channel (BOC) buffer 212. BOC buffer 212 stores bytes from the separate data streams until entire words (a fixed number of bytes) are accumulated for a given data stream. The accumulated words are transferred from BOC buffer 212 to channel buffer 220, where there are stored until required for decoding. Channel buffer 220 is preferably a DRAM memory. Channel buffer 220 allows the accumulation of a significant quantity of the various channels of data, thereby providing some flexibility for synchronization between the bit rate of DVD reader 200 and the decoding rate of bitstream decoder 214. Data from channel buffer 220 are transferred to bitstream decoder 214 through top of channel (TOC) buffer 213, which is a local buffer inside decoder 210. Bitstream decoder 214 generates decoded video data and provides the decoder and video data to frame buffer memory 230. Frame buffer memory 230 is preferably a DRAM located outside of decoder 210. Frame buffer memory 230 may be comprised in a larger memory with channel buffer 220. Frame buffer memory 230 includes sufficient storage space to hold more than one decompressed video frame. In one embodiment, frame buffer memory 230 simultaneously stores three separate video frames, and in another embodiment frame buffer memory 230 stores five decompressed video frames. Display processor 215 reads the decompressed frames from frame buffer memory 230 and provides the decompressed frames to rasterizer 240. Display processor 215 exchanges information with bit-stream decoder 214 on the locations and types of video frames stored in frame buffer memory 230.

As described below, display processor 215 can coordinate the reverse play of frames by controlling the storage of frames in frame buffer memory 230 and selecting an appropriate sequence of replay of the frames from frame buffer memory 230.

FIG. 3: Method for Displaying Video Frames in Reverse Order

One embodiment of a method for displaying video frames in reverse order is described in FIG. 3. In a preferred embodiment, the video frames are MPEG-2 video frames received from a DVD reader that has random access to GOP portions of a video stream.

The first step 310 in the method is to decode and store a number of frames from a group of pictures. In one embodiment, display processor 215 coordinates the storage so that a number of frames is stored in order of decoding into frame buffers in frame buffer memory 230. The frame buffers have an ordering (from first to last) and the storage is done according to the ordering of the frame buffer (i.e., the first decoded frame goes to the first frame buffer.) In step 320, the frames stored in step 310 are read from frame buffer memory 230 according to a reverse ordering of the frame buffers. They are thus displayed in the opposite order than they were decoded. As each of these frames is displayed, it is removed from its frame buffer and a newly decoded frame is put into its place. These newly decoded frames are received from a GOP that precedes the first GOP. Note that since these new frames are stored one at a time as the old frames are removed, these new frames are stored according to the reverse order of the frame buffers.

After these newly decoded frames are all stored, they are displayed in step 330 in the opposite order than they were stored, that is, according to the ordering of the frame buffers. Once again, this means these frames are displayed in the opposite order than they were decoded. As each of these frames is decoded, it is replaced with a newly decoded frame from another preceding GOP.

Steps 320 and 330 are repeated for the further preceding GOPs. Thus the GOPs are displayed in their reverse order, since in both steps 320 and 330 the frames are displayed in the opposite order than they were decoded and stored. This method, therefore, displays successive GOPs in reverse order, and successive frames in each GOP in reverse order. The result is a frame-by-frame reverse play. FIGS. 5 and 6 provide detailed examples of this technique. Step 340 determines if reverse play is to continue. If so, steps 320 and 330 are repeated. Otherwise, the reverse play procedure terminates.

FIG. 4: Memory Management for Normal Play

FIG. 4 is a series of time-ordered graphs showing the order in which frames are decoded, stored, and displayed. Line 400 shows a desired order for displaying a sample set of frames. The sample set of frames includes I-frames, B-frames and P-frames. The subscripts of the frames indicates the intended chronological order for display. Line 410 shows the order in which these frames are available from the decoder, as discussed earlier. Lines 420 through 460 show steps for analyzing this sequence of frames and reordering it, using three frame buffers, into the desired order of display. Line 420 is a graph showing which frames are decoded as a function of time. The order of frames in line 420 is, therefore, the same as the order in line 410. Line 425 shows which of three frame pointers is used to direct the decoded frame into a memory location. The three frame pointers are designated F (for forward), B (for backward), and C (for current). The C pointer is used whenever a B frame is being read. It points to a memory location that is used to display a current frame. The F and B pointers are used for directing anchor frames (I and P frames) to the appropriate frame buffers. Since two anchor frames are required for decoding a B frame, the F and B pointers alternate between receiving successive anchor frames. Between them, they thus always point to the latest two anchor frames. The choice of which pointers to use—F, B, or C—is preferably automated in hardware. As can be seen from line 425, the F and B pointers alternate between receiving the latest anchor frame, and the C pointer is used for receiving B frames.

Line 430 shows the contents of the three frames buffers. Leaving aside for now the F, B and C pointers, it is noted that three frame buffers are sufficient for forward play of MPEG-2 video. Two of the frame buffers, here designated M1 and M2, store the latest two anchor frames. A third frame buffer, here designated M3, stores the latest B frame. Thus the latest two anchor frames and the latest B frame remain available for display and processing as required. In line 430, the first I frame $I_0$ is stored into frame buffer M1, and the second anchor frame $P_3$ is stored into frame buffer M2 on the next cycle. Anchor frame $I_0$ is displayed, but $P_3$ is not—until frames $B_1$ and $B_2$ are decoded and displayed. This order. of display is presented in line 440. Once anchor frame $P_3$ is displayed, subsequent B frames may use it as the preceding anchor frame. Thus, anchor frame $I_0$ is no longer necessary and anchor frame $P_6$ is decoded and stored in frame buffer M1, thereby replacing anchor frame $I_0$ (as seen in line 430). Frame buffers M1 and M2 thereafter hold anchor frames $P_6$ and $P_3$, which serve as the anchor frames until $P_3$ is replaced by $I_9$.

Lines 452, 454 and 456 show the frame buffers to which pointers F, B and C must point in order to achieve the results shown in line 430. As can be seen from line 430, during the first cycle $I_0$ was stored into M1 and $P_3$ was stored into M2. Since these frames were stored using pointers F and B, respectively, pointers F and B were required to point to frame buffers M1 and M2 during those cycles. This requirement is indicated on lines 452 and 454. As can be seen from the remainder of lines 452 and 454, pointer F remains directed at frame buffer M1 and pointer B remains directed at frame buffer M2. Similarly, pointer C remains directed at frame buffer M3. Thus, in normal forward play with three frame buffers, the F, B and C pointers remain fixed throughout the play.

Line 460 shows behavior of a display pointer D. This pointer indicates which frame buffer should be used for displaying a frame according to the display order indicated in line 440. Display pointer D starts by indicating an initial display buffer M*. M* is chosen to provide an appropriate display, such as a logo or a blank screen, during the necessary delay time before the decoded information can start to be displayed. Once anchor frame $P_3$ is loaded into frame buffer M2 during the second cycle, anchor frame $I_0$ can be displayed. Thus, during the second cycle, the D pointer must point to frame buffer M1, which holds anchor frame $I_0$. Thereafter, display pointer D changes its indicated location among the three frame buffers M1, M2, M3, as shown in line 470.

Although pointers F, B and C do not change the frame buffers to which they respectively point in the normal play mode, these dynamic pointers are necessary for the reverse play mode. As will be seen in the following figures, in this mode the pointers each change their target frame buffers from cycle to cycle.

FIGS. 5 and 6: Fast Reverse Play

FIG. 5 is a similar diagram to FIG. 4, but instead of showing the case for regular forward play, it shows the mechanism for a fast reverse play. In this mode, B frames are ignored and anchor frames from a given GOP are displayed in reverse order. The number of anchor frames displayed can be chosen to provide a rapid but fluent reverse play. After the anchor frames from one GOP are displayed, a prior GOP is decoded and its anchor frames are displayed, again in reverse order.

Line 500 of FIG. 5 shows a sequence, of nine anchor frames arranged in the desired order for reverse play. For this figure, subscripts on a frame indicate its chronological order within a GOP, and superscripts indicate the chronological order of the GOP to which it belongs. Nine frames are shown in line 500: three from $GOP^0$, three from $GOP^1$, and three from $GOP^2$. The desired display shown in line 500 presents these frames in reverse chronological order: decreasing GOP number and decreasing frame number within each GOP. Line 510 shows the order in which these frames are available from the decoder. Since the decoder has random access to the beginning of each GOP, the GOPs are individually accessible. Thus, $GOP^2$ is decoded first, followed by $GOP^1$ and $GOP^0$. The individual frames within a GOP, however, must be decoded in forward chronological order. Lines 520 through 560 indicate the technique for reversing the order of frames within each GOP. Line 520 shows which anchor frame is decoded as a function of time, and line 525 shows which pointer is used to direct each of the frames to frame buffers. As shown in line 525, the pointers follow the normal protocol: since no B frames are being decoded, the pointers alternate between F and B pointers. Line 530 shows the desired assignment of the anchor frames into the three frame buffers M1, M2 and M3. As shown in line 530, frames $I_0^2$ and $P_3^2$ are decoded first. They are not, however, yet displayed but stored in frame buffers M1 and M2. The chronologically last frame in the nine frame sequence, $P_6^2$, is decoded in the third cycle. It is displayed immediately thereafter, as shown in line 540. On subsequent cycles, frame $P_3^2$ and frame $I_0^2$ are displayed and as shown in line 530, and their frame buffers are immediately overwritten with newly decoded frames. Note that these three frames were stored in the order that they were decoded, but displayed in the opposite order. The scheme shown in lines 530 and 540 achieves the same effect for frames in $GOP^1$, and then again for the frames for $GOP^0$, thereby displaying the nine frame sequence in reverse order.

Lines 552 and 554 show the orders in which frame buffers M1, M2 and M3 are accessed. During the first three cycles, these frame buffers are used in order (M1, M2, M3) to store three consecutive frames. During the next three cycles, they are used in reverse order (M3, M2, M1) to display three frames and to store three new frames. Thereafter, they are repeatedly used in order and in reverse order to achieve the reverse play. Line 560 shows the frame buffer to which display pointer D points in order to extract the appropriate frames from the frame buffers.

FIG. 6 illustrates the technique demonstrated in FIG. 5, but for the case where five frame buffers are available for storage. A limitation for the three-frame buffer case of FIG. 5 was that only three frames from each GOP could be displayed in the reverse display mode. In general, with N frame buffers, the reverse play mode may display up to N frames from each GOP. As shown in FIG. 6, five frames from each GOP are displayed using the five frame buffers M1–M5. As can be seen from this figure, the overall technique for the fast reverse play is the same as was the case for the three frame buffer situation. The frame buffers are accessed alternately in order and in reverse order to consistently display the frames from each GOP in reverse chronological order.

Another embodiment of reverse display is a "slow reverse" mode. This embodiment uses the pointer structures described in FIGS. 5 and 6, but displays all the frames from a GOP—including the B frames—in reverse order. This slow reverse mode can be achieved by sending the same GOP to the decoder M times, where M is the number of frames in the GOP, and with the display unit displaying one picture each time the GOP is sent. Other embodiments are contemplated wherein some but not all of the B frames are displayed, and/or some but not all of the anchor frames are displayed.

What is claimed is:

1. A method of displaying a series of video frames in reverse order, wherein the video frames are received in groups from a storage medium, wherein the groups are received in reverse chronological order, and wherein each group comprises a chronologically ordered set of video frames, the method comprising:

a first write pointer advancing through N frame buffers, numbered from 1 to N, in ascending order from 1 to N, wherein N is an integer greater than 1;

a second write pointer advancing through the N frame buffers in descending order from N to 1, wherein the second write pointer advances through the N frame buffers at the same time as the first write pointer advances through the N frame buffers;

sequentially storing N video frames from each successively received group into the N frame buffers, wherein the N video frames from each of the successively received groups make up the series of video frames, wherein said sequentially storing comprises alternating between storing successive video frames in the series into one of the N frame buffers currently indicated by the first write pointer and into one of the N frame buffers currently indicated by the second write pointer;

sequentially retrieving the N frames of each group from the N frame buffers in an opposite numerical order of an order in which the N frames of that group were stored into the N frame buffers; and displaying the N frames of each group in the order in which the N frames are retrieved.

2. The method of claim 1, wherein the storage medium is a DVD disk.

3. The method of claim 1, wherein the storage medium is a computer hard drive.

4. The method of claim 1, wherein the storage medium is a CD ROM.

5. The method of claim 1, wherein the storage medium is a random-access memory (RAM).

6. The method of claim 1, wherein the series of video frames is a series of MPEG video frames.

7. The method of claim 1, wherein the series of video frames is a series of MPEG 2 video frames.

8. The method of claim 1, wherein the series of video frames is a series of MPEG video frames and each group is a group of pictures (GOP).

9. The method of claim 1, wherein the N frame buffers are comprised in a random-access memory (RAM).

10. A video decoder configured to display a series of video frames in reverse order, wherein the video frames are received in groups from a storage medium, wherein the groups are received in reverse chronological order, and wherein each group comprises a chronologically ordered set of video frames, the video decoder comprising:

N frame buffers, numbered from 1 to N, wherein N is an integer greater than 1, wherein each of the frame buffers is configured to store one video frame;

a bitstream decoder coupled to the storage medium and to the N frame buffers, wherein the bitstream decoder is configured to receive the series of video frames from the storage medium and to sequentially store N frames of each group, received in chronological order, into the N frame buffers, wherein the N frames from each of the groups make up the series of video frames, wherein the bitstream decoder is configured alternate between storing successive video frames in the series into one of the frame buffers currently indicated by a first write pointer and one of the frame buffers currently indicated by a second write pointer, wherein when video frames are to be displayed in reverse order, the first write pointer is configured to advance through the N frame buffers in ascending order 1 to N and the second write pointer is configured to advance through the N frame buffers in descending order N to 1, wherein the first and second write pointers are configured to advance through the N frame buffers at the same time;

a display processor coupled to the N frame buffers, wherein the display processor is configured to sequentially retrieve the N frames of each group from the N frame buffers in a reverse numerical order of an order in which the N frames of each group were stored in the N frame buffers and to display the N frames of the first group in the order retrieved.

11. The video decoder of claim 10, wherein the series of video frames is a series of MPEG video frames.

12. The video decoder of claim 10, wherein the series of video frames is a series of MPEG 2 video frames.

13. The video decoder of claim 10, wherein the series of video frames is a series of DVD video frames.

14. The video decoder of claim 10, wherein the frame buffers are comprised in a random-access memory (RAM).

15. The video decoder of claim 10, wherein when video frames are to be displayed in normal order, the first write pointer is configured to indicate a first one of the N frame buffers and the second write pointer is configured to indicate a second one of the N frame buffers, wherein the first and second write pointers do not advance through the N frame buffers when video frames are to be displayed in normal order.

* * * * *